United States Patent
Hatanaka

(10) Patent No.: US 9,915,388 B2
(45) Date of Patent: Mar. 13, 2018

(54) QUICK CONNECTOR

(71) Applicant: SUMITOMO RIKO COMPANY LIMITED, Komaki-shi, Aichi (JP)

(72) Inventor: Kazuki Hatanaka, Kasugai (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 345 days.

(21) Appl. No.: 14/919,435

(22) Filed: Oct. 21, 2015

(65) Prior Publication Data
US 2016/0040813 A1    Feb. 11, 2016

Related U.S. Application Data

(63) Continuation of application No. PCT/JP2014/076366, filed on Oct. 2, 2014.

(30) Foreign Application Priority Data

Oct. 31, 2013   (JP) .................................. 2013-226767

(51) Int. Cl.
F16L 37/00    (2006.01)
F16L 37/14    (2006.01)

(52) U.S. Cl.
CPC ......... F16L 37/144 (2013.01); *F16L 2201/10* (2013.01)

(58) Field of Classification Search
CPC ..... F16L 37/148; F16L 37/144; F16L 37/142; F16L 37/0841
USPC ....................................................... 285/305
See application file for complete search history.

(56) References Cited

U.S. PATENT DOCUMENTS

| 7,823,930 | B2 * | 11/2010 | Feger | F16L 37/144 285/23 |
| 8,297,659 | B2 * | 10/2012 | Callahan | F16L 37/144 285/305 |
| 2008/0150280 | A1 | 6/2008 | Feger et al. | |
| 2010/0019483 | A1 * | 1/2010 | Bokuhn | F16L 37/144 285/93 |

(Continued)

FOREIGN PATENT DOCUMENTS

| JP | 2006183833 A | 7/2006 |
| JP | 2008512607 A | 4/2008 |
| WO | 2006074719 A1 | 7/2006 |

OTHER PUBLICATIONS

Dec. 22, 2014 Search Report issued in International Patent Application No. PCT/JP2014/076366.

(Continued)

*Primary Examiner* — Aaron M Dunwoody
(74) *Attorney, Agent, or Firm* — Oliff PLC

(57) ABSTRACT

Each detecting leg includes a detection portion provided on the end side of the detecting leg to protrude inward in the diametric direction, and contacting with an annular boss at an initial position, and a push-in inhibition portion provided in the detecting leg on the side of a base from the detection portion, locked in the push-in direction to a connector body in a state where the detecting leg does not bend to the inner side in the axial direction at the initial position, and put in such a state as being not locked in the push-in direction to the connector body in a state where the detecting leg bends to the inner side in the axial direction.

6 Claims, 12 Drawing Sheets

(56) References Cited

U.S. PATENT DOCUMENTS

2012/0161435 A1\* 6/2012 Yamada ................ F16L 37/133
                                                      285/305
2012/0326435 A1\* 12/2012 Okazaki ................ F16L 37/088
                                                      285/84
2016/0298800 A1\* 10/2016 Gocha ................... F16L 37/144
2017/0146173 A1\* 5/2017 Chaupin ............. F16L 37/1225
2017/0248263 A1\* 8/2017 Terada ................. F16L 37/144
2017/0284581 A1\* 10/2017 Ackermann ........ F16L 37/0841

OTHER PUBLICATIONS

Dec. 22, 2014 Written Opinion issued in International Patent Application No. PCT/JP2014/076366.

\* cited by examiner

QUICK CONNECTOR

CROSS REFERENCE TO RELATED APPLICATIONS

The present application is a Continuation Application of International Application No. PCT/JP2014/076366, filed on Oct. 2, 2014, which claims priority to Japanese Patent Application No. 2013-226767, filed on Oct. 31, 2013, the entire contents of which are incorporated herein by reference in their entireties.

BACKGROUND OF THE INVENTION

1. Field of the Invention

The present invention relates to a quick connector to be coupled together with a piped body having an annular boss.

2. Description of the Related Art

Connectors described in JP-A-2008-512607 and JP-A-2006-183833 each have a connector body and a retainer, the retainer being pushed in the connector body, thereby being able to be locked to an annular boss of a piped body. To enable the push-in operation of the retainer, the piped body is required to be inserted at a proper position into the connector body. That is, in the connector, by the push-in operation of the retainer, it is possible to confirm whether the piped body is inserted at the proper position.

In the connector, detecting legs of the retainer are pressed in the axial direction by the annular boss of the piped body at an initial position, and thus bend in the axial direction. This operation enables the push-in operation of the retainer.

In the connector, when the piped body is not inserted in a state where the retainer is placed at the initial position, the push-in operation of the retainer is not enabled. In detail, the ends of the detecting legs of the retainer are locked in the push-in direction to the connector body. When the piped body is inserted, the annular boss of the piped body presses the ends of the detecting legs in the axial direction, so that the detecting legs bend. Then, the locking of the ends of the detecting legs to the connector body in the push-in direction is canceled. Thus, the push-in operation of the retainer is enabled. In this manner, the portions of the retainer pressed in the axial direction by the annular boss of the piped body function as the portions locked in the push-in direction to the connector body.

The detecting legs, which are made thinner to make the connector smaller, are lowered in rigidity. When the push-in operation of the retainer is carried out in a state where the piped body is not inserted, there is a possibility that the detecting legs of the retainer are buckled, to cancel the locking of the detecting legs to the connector body. In particular, since the ends of the detecting legs are locked, the bending of the detecting legs makes the locking of the ends of the detecting legs to the connector body likely to be canceled. Consequently, the detecting legs of the retainer cannot be easily made smaller.

The present invention has been made in view of such circumstances. Accordingly, it is an object to provide a quick connector which can make detecting legs of a retainer smaller, and to securely detect the insertion of a piped body.

SUMMARY OF THE INVENTION

A quick connector according to the present invention includes a connector body into which a piped body having an annular boss can be inserted, and a retainer provided movably relative to the connector body from an initial position to a confirmation position by a push-in operation in a direction crossing an axial direction of the connector body and locking in the axial direction to the annular boss at the confirmation position.

The retainer includes a base, paired locking legs provided at both ends of the base, allowing passing of the annular boss at the initial position, and locking in the axial direction to the annular boss at the confirmation position, and paired detecting legs provided at both ends of the base and on an inner side in the axial direction from the paired locking legs, bending to the inner side in the axial direction by contact with the annular boss at the initial position, and allowing the retainer to move to the confirmation position in a state where the paired detecting legs bend.

Each of the paired detecting legs includes a detection portion provided on the end side of the detecting leg to protrude inward in a diametric direction, and contacting with the annular boss at the initial position, and a push-in inhibition portion provided to the detecting leg on the side of the base from the detection portion, locked in a push-in direction to the connector body in a state where the detecting leg does not bend to the inner side in the axial direction at the initial position, and put in such a state as being not locked in the push-in direction to the connector body in a state where the detecting leg bends to the inner side in the axial direction.

In the quick connector, the detection portion and the push-in inhibition portion are provided at different parts. The detection portion, which is pressed by the annular boss of the piped body, is provided on the end side of the detecting leg. The push-in inhibition portion, which is locked in the push-in direction to the connector body, is provided on the side of the base from the detection portion, in some of the detecting leg. Thus, the distance from the base to the push-in inhibition portion is shorter than the distance from the base to the detection portion.

When the push-in operation of the retainer is carried out in a state where the piped body is not inserted, even if the detecting leg of the retainer is buckled, the bending length is shorter than conventional ones. Thus, the shift amount of the push-in inhibition portion is small. Even with the detecting leg being made smaller, when the piped body is not inserted, the retainer can be inhibited from moving from the initial position to the confirmation position by the push-in operation. That is, the quick connector can make the detecting leg of the retainer smaller, and to securely detect the insertion of the piped body.

DETAILED DESCRIPTION OF THE PREFERRED EMBODIMENTS

1. Outline of Quick Connector 1

Figure 1A:
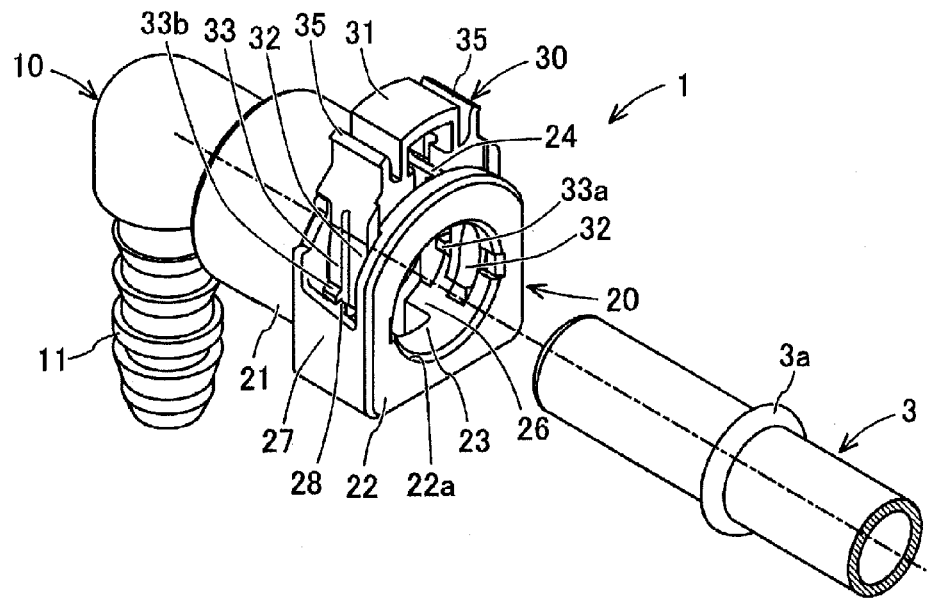
FIG. 1A is a perspective diagram of a quick connector and a piped body in a state before the quick connector is coupled together with the piped body.

The outline of a quick connector 1 according to one of the present embodiments will be explained with reference to FIG. 1A, FIG. 1B, and FIG. 2. The quick connector 1 is used for constructing automotive piping, for instance. That is, the quick connector 1 forms a flow passage for distributing fuel, for instance. A resinous tube (not illustrated in the drawings) covers one end side of the quick connector 1, and a piped body 3 is inserted on the other end side of the quick connector 1. In this manner, the resinous tube is coupled together with the piped body 3.

Figure 1B:
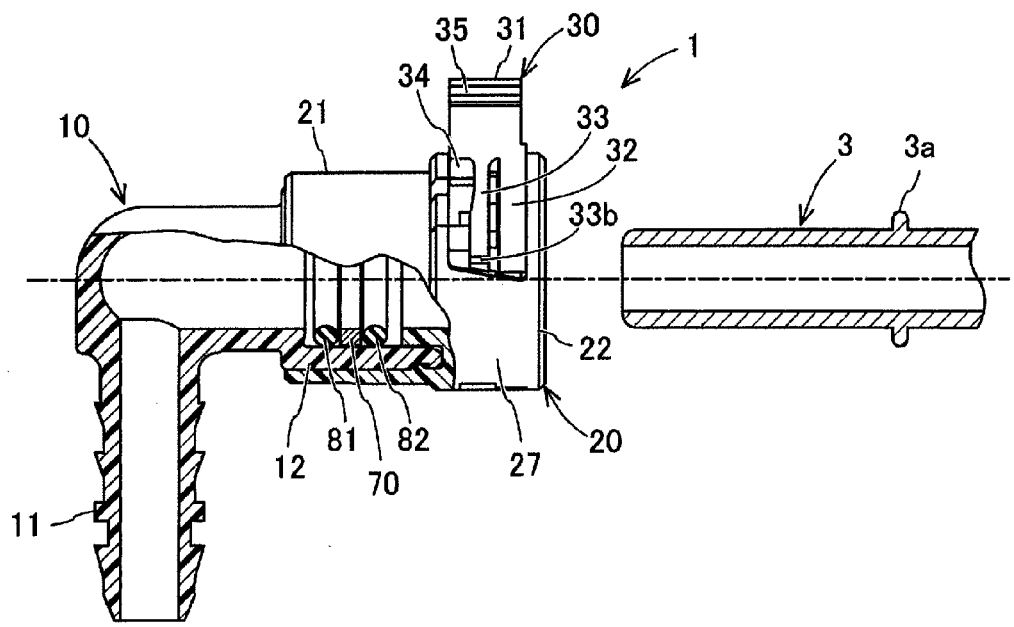
FIG. 1B is an axial cross-sectional diagram of the quick connector and the piped body in a state before the quick connector is coupled together with the piped body.
Figure 2:
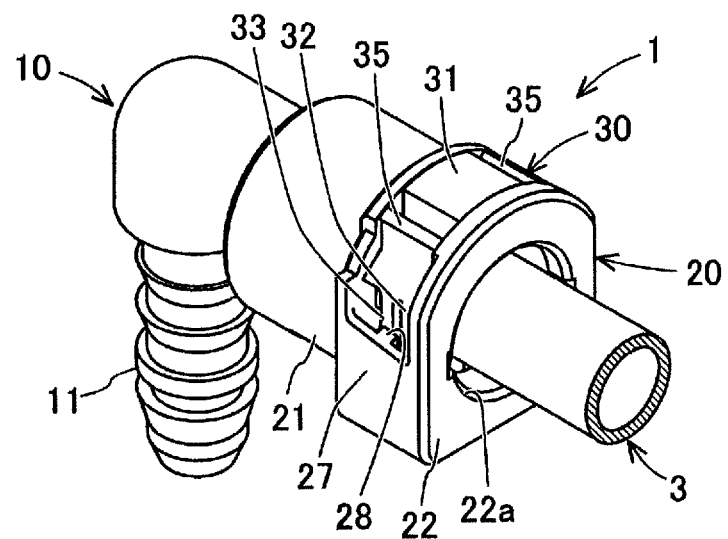
FIG. 2 is a perspective diagram of the quick connector and the piped body in a state where the quick connector is coupled together with the piped body.

As illustrated in FIG. 1A and FIG. 1B, the piped body 3 is formed into a tubular shape, and is equipped with an annular boss 3a (flange) which is formed to protrude to the outside in the diametric direction, at a position separated off at a distance from the leading end in the axial direction. In the following description, when viewed from the axial direction of the piped body 3, the push-in direction of a retainer 30 is the down direction, and the pull-out direction (i.e., the direction opposite to the push-in direction) is the up direction.

The quick connector 1 includes a first housing 10 and a second housing 20 each of which is a connector body, the retainer 30, a collar 70, and annular sealing members (81, 82).

The first housing 10 (connector body) is made of glass-fiber reinforced polyamide, for instance, and is formed integrally into a penetrated tubular shape. Note that, although the first housing 10 illustrated in FIG. 1 takes on a configuration formed to be penetrated as a letter-'L' shape, in addition to that, the first housing 10 may be formed to be penetrated linearly.

As illustrated in FIG. 1A and FIG. 1B, a tube-connection portion 11, which is connected with the resinous tube (not illustrated in the drawings), is disposed on one of the opposite-end side of the first housing 10 (i.e., on the lower left side in FIG. 1B). The outer peripheral face of the tube-connection portion 11 is formed into a stepped shape toward the axial direction along the flow passage in order to keep the resinous tube in the state of being fitted into lest it should come off.

Meanwhile, a pipe-insertion portion 12, which is opened so as to make the leading end of the piped body 3 insertable thereinto, is disposed on another one of the opposite-end sides of the first housing 10 (i.e., on the right side in FIG. 1B). On the inner-peripheral side of the pipe-insertion portion 12, the annular sealing members (81, 82), which are made of fluororubber, for instance, and the collar 70, which is made of resin, are accommodated so as to interpose the collar 70 between the annular sealing members (81, 82) in the axial direction. The leading end of the piped body 3 comes to be inserted into these on their inner-peripheral sides.

As illustrated in FIG. 1A and FIG. 1B, the second housing 20 (connector body) is made of glass-fiber reinforced polyamide, for instance, and is formed integrally into a tubular shape virtually. The second housing 20 is coupled together with the first housing 10 on the side of the pipe-insertion portion 12.

The retainer 30 is made of glass-fiber reinforced polyamide, for instance. The retainer 30 is provided movably on the second housing 20 by a push-in operation by an operator or worker in the diametric direction (i.e., in the direction crossing the axial direction of the second housing 20). When the piped body 3 is inserted at a proper position into the second housing 20, as illustrated in FIG. 2, the retainer 30 can be moved from an initial position to a confirmation position. Thus, when the push-in operation of the retainer 30 is enabled, the operator or worker can confirm whether the piped body 3 is inserted at the proper position.

Further, when the push-in operation of the retainer 30 is carried out, the retainer 30 is locked in the axial direction to the annular boss 3a of the piped body 3. That is, by carrying out the push-in operation of the retainer 30, the operator or worker can confirm whether the piped body 3 is inserted at the proper position and is prevented from coming off by the retainer 30.

2. Detailed Constructions of Second Housing 20

Detailed constructions of the second housing 20 will be hereinafter described with reference to FIG. 3A through FIG. 3K. The second housing 20 includes a tubular portion 21, an opening-end seat member 22, a lower-part coupler member 23, an upper-part coupler member 24, first pull-out locked portions (25, 25), second pull-out locked portions (26, 26), and paired side walls (27, 27).

The tubular portion 21 is fitted into the pipe-insertion portion 12 of the first housing 10. The collar 70 and the annular sealing members (81, 82) are positioned in a middle axially between the stepped portion in the first housing 10 and the end face of the tubular portion 21.

Figure 3A:
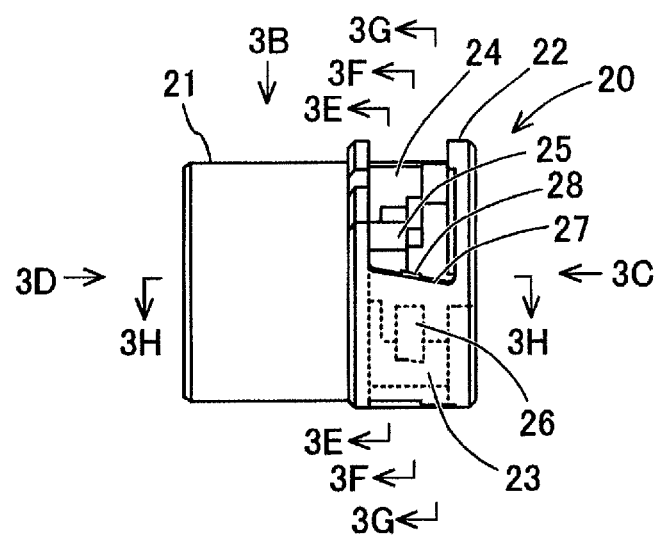
FIG. 3A is a front diagram of a second housing.
Figure 3B:
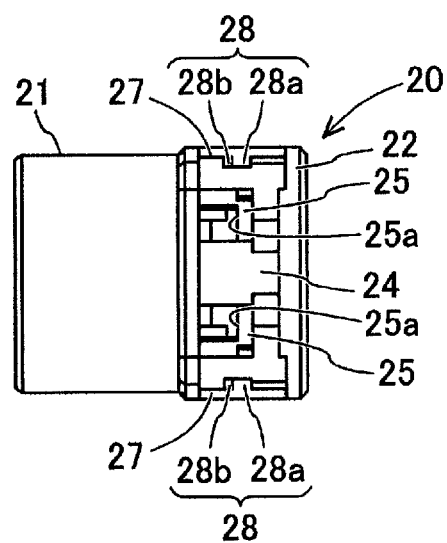
FIG. 3B is a diagram viewed from the direction of the arrow "3B" in FIG. 3A.
Figure 3C:
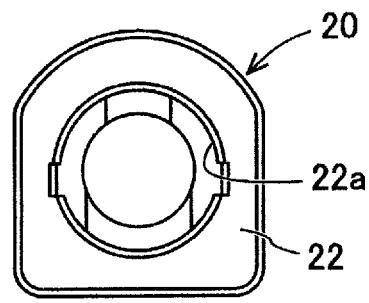
FIG. 3C is a diagram viewed from the direction of the arrow "3C" in FIG. 3A.
Figure 3D:
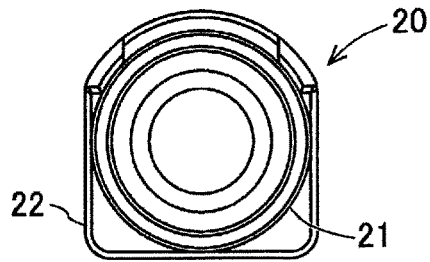
FIG. 3D is a diagram viewed from the direction of the arrow "3D" in FIG. 3A.
Figure 3E:
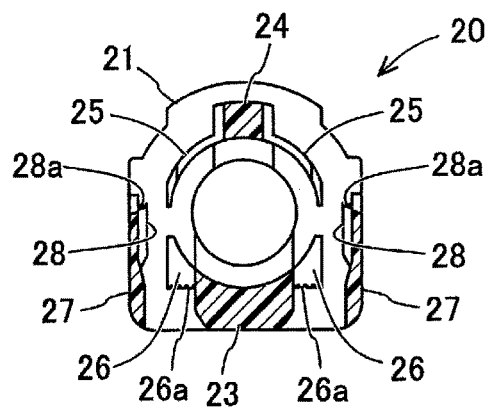
FIG. 3E is a cross-sectional diagram taken along the line "3E"-"3E" in FIG. 3A.
Figure 3F:
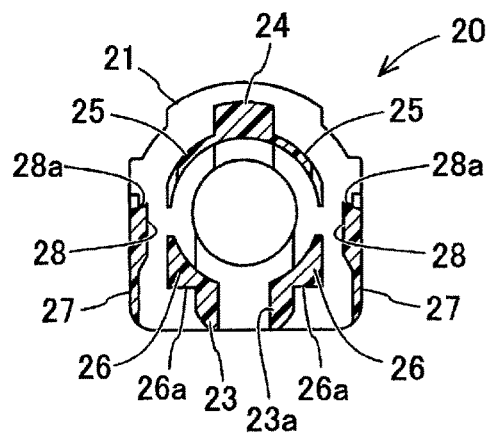
FIG. 3F is a cross-sectional diagram taken along the line "3F"-"3F" in FIG. 3A.
Figure 3G:
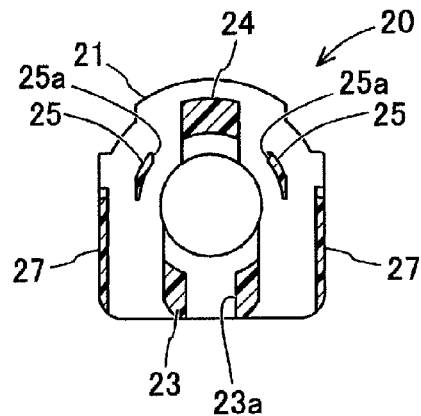
FIG. 3G is a cross-sectional diagram taken along the line "3G"-"3G" in FIG. 3A.
Figure 3H:
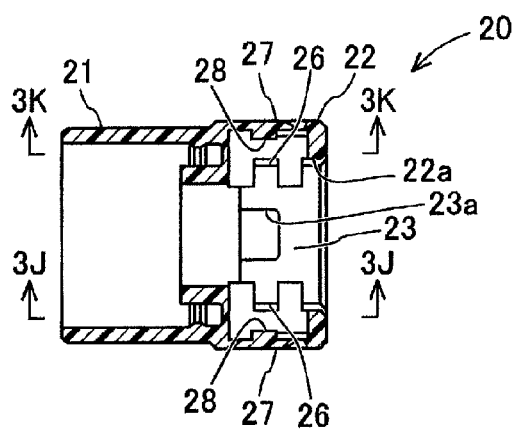
FIG. 3H is a cross-sectional diagram taken along the line "3H"-"3H" in FIG. 3A.

As illustrated in FIG. 3A through FIG. 3C and FIG. 3H, the opening-end seat member 22 is disposed coaxially while separated off at a distance from the tubular portion 21 in the axial direction. In addition, as illustrated in FIG. 3C and FIG. 3H, a central bore 22a is formed in the opening-end seat member 22. The central bore 22a is formed to have a size, which enables the annular boss 3a of the piped body 3 to pass therethrough.

As illustrated in FIG. 3E through FIG. 3J, the lower-part coupler member 23 is the portion which couples the lower part of the tubular portion 21 together with the lower part of the opening-end seat member 22 in the axial direction. A through-hole 23a is formed in the lower-part coupler member 23. The through-hole 23a is provided so that the operator or worker can view the annular boss 3a of the piped body 3 from the outside (i.e., from the lower part) when the piped body 3 is inserted into the quick connector 1. As illustrated in FIG. 3E through FIG. 3J, the upper-part coupler member 24 couples the upper part of the tubular portion 21 together with the upper part of the opening-end seat member 22. The lower-part coupler member 23 and the upper-part coupler member 24 are provided at positions where they do not interfere in the axial direction with the annular boss 3a of the piped body 3.

As illustrated in FIG. 3B, FIG. 3E through FIG. 3G, and FIG. 3J, the first pull-out locked portions (25, 25) are extended out in the down direction from the right and left ends of the lower side face of the upper-part coupler member 24 so as to be away from each other. The first pull-out locked portions (25, 25) are provided on the side of the tubular portion 21 from the axial center, in some of the upper-part coupler member 24. That is, a clearance is formed axially between each of the first pull-out locked portions (25, 25) and the opening-end seat member 22. As illustrated in FIG. 3G, through-holes (25a, 25a), which are penetrated in the up/down direction, are formed in the first pull-out locked portions (25, 25) on the side of the tubular portion 21.

The first pull-out locked portions (25, 25) are provided at positions where they do not interfere in the axial direction with the annular boss 3a of the piped body 3. When the retainer 30, which will be described later, is placed at the initial position, the ends of the first pull-out locked portions (25, 25) are locked in the pull-out direction to detection portions (33a, 33a) of paired detecting legs (33, 33) of the retainer 30.

As illustrated in FIG. 3E through FIG. 3H, the second pull-out locked portions (26, 26) are extended out in the up direction from the right and left ends of the upper side face of the lower-part coupler member 23 so as to be away from each other. The second pull-out locked portions (26, 26) are provided at the axial center in some of the lower-part coupler member 23. That is, a clearance is formed axially between each of the second pull-out locked portions (26, 26) and the opening-end seat member 22, and a clearance is formed axially between each of the second pull-out locked portions (26, 26) and the tubular portion 21.

Figure 3J:
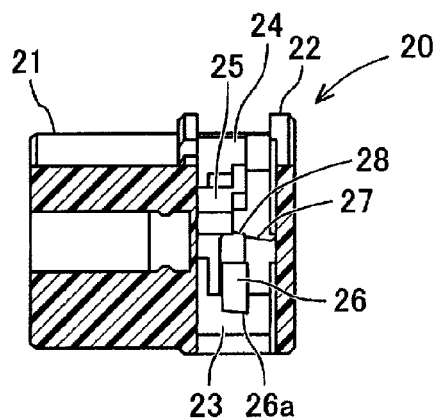
FIG. 3J is a cross-sectional diagram taken along the line "3J" "3J" in FIG. 3H.

As illustrated in FIG. 3F, the upper ends of the second pull-out locked portions (26, 26) are formed into an acute-angled shape. A clearance in the up/down direction is formed between the upper end of each of the second pull-out locked portions (26, 26) and each of the first pull-out locked portions (25, 25). As illustrated in FIG. 3J, lower faces (26a, 26a) of the second pull-out locked portions (26, 26) are inclined in the up direction toward the inner side in the axial direction. That is, the normal vector of the lower faces (26a, 26a) of the second pull-out locked portions (26, 26) has a component on the inner side in the axial direction and a component in the push-in direction (i.e., a lower side component).

The second pull-out locked portions (26, 26) are provided at positions where they do not interfere in the axial direction with the annular boss 3a of the piped body 3. When the retainer 30, which will be described later, is placed at the confirmation position, the lower faces (26a, 26a) of the second pull-out locked portions (26, 26) are locked in the pull-out direction to the detection portions (33a, 33a) of the paired detecting legs (33, 33) of the retainer 30.

As illustrated in FIG. 3A and FIG. 3E through FIG. 3H, the paired side walls (27, 27) couple both the side faces of the tubular portion 21 together with both the side faces of the opening-end seat member 22, respectively. In particular, the paired side walls (27, 27) couple the lower side parts from the centers in the up/down direction, in some of the side faces of the tubular portion 21 and the opening-end seat member 22. The upper faces of the paired side walls (27, 27) are inclined in the down direction toward the insertion side in the axial direction. Each of the paired side walls (27, 27) is provided so as to have a clearance in the diametric direction relative to each of the paired first pull-out locked portions (25, 25) and each of the paired second pull-out locked portions (26, 26).

Push-in locked portions (28, 28), which protrude inward, are provided at the axial centers in some of the inside faces of the paired side walls (27, 27). That is, a clearance is formed axially between each of the push-in locked portions (28, 28) and the tubular portion 21, and a clearance is formed axially between each of the push-in locked portions (28, 28) and the opening-end seat member 22. The upper faces of the push-in locked portions (28, 28) are placed above the upper ends of the second pull-out locked portions (26, 26).

Figure 3K:
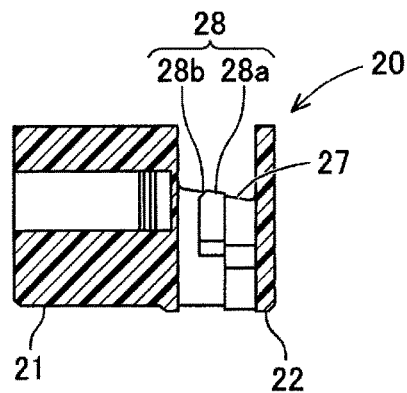
FIG. 3K is a cross-sectional diagram taken along the line "3K"-"3K" in FIG. 3H.
Figure 4A:
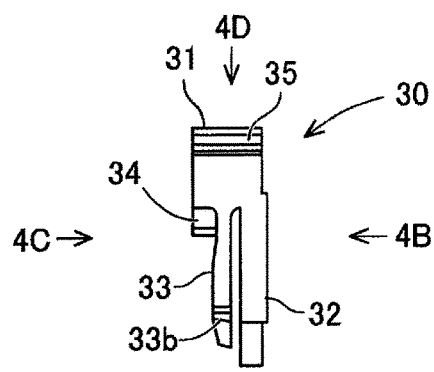
FIG. 4A is a front diagram of a retainer.
Figure 4B:
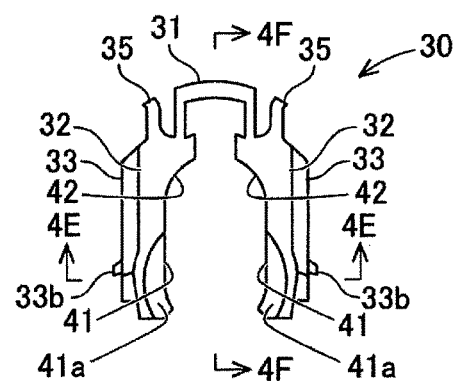
FIG. 4B is a diagram viewed from the direction of the arrow "4B" in FIG. 4A.
Figure 4C:
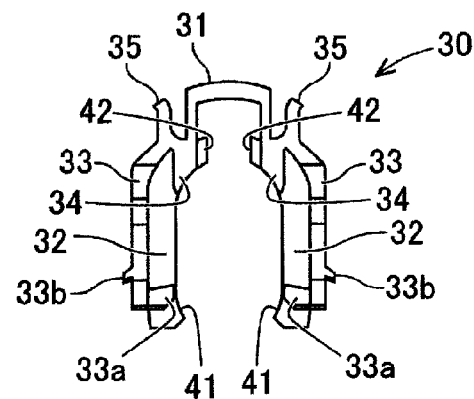
FIG. 4C is a diagram viewed from the direction of the arrow "4C" in FIG. 4A.
Figure 4D:
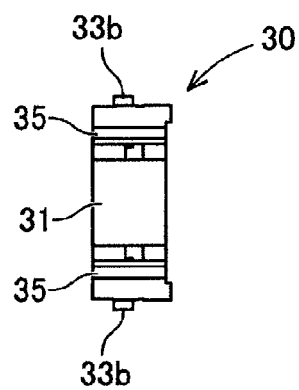
FIG. 4D is a diagram viewed from the direction of the arrow "4D" in FIG. 4A.
Figure 4E:
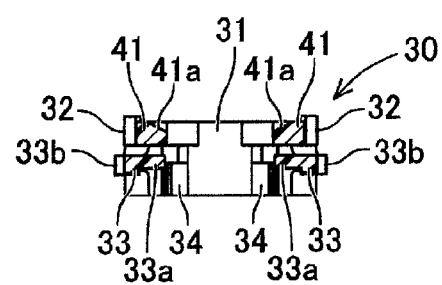
FIG. 4E is a cross-sectional diagram taken along the line "4E"-"4E" in FIG. 4B.
Figure 4F:
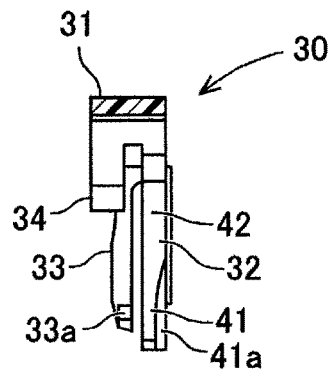
FIG. 4F is a cross-sectional diagram taken along the line "4F"-"4F" in FIG. 4B.

As illustrated in FIG. 3K, push-in inhibition inclined faces (28a, 28a), which are inclined in the down direction toward the insertion side in the axial direction, are formed on the insertion side in the axial direction, in some of the upper faces of the push-in locked portions (28, 28). That is, the normal vector of the push-in inhibition inclined faces (28a, 28a) has a component on the insertion side in the axial direction and a component in the pull-out direction.

As illustrated in FIG. 3K, return inclined faces (28b, 28b), which are inclined in the down direction toward the inner side in the axial direction, are formed on the inner side in the axial direction from the push-in inhibition inclined faces (28a, 28a), in some of the upper faces of the push-in locked portions (28, 28). That is, the normal vector of the return inclined faces (28a, 28a) has a component on the inner side in the axial direction and a component in the pull-out direction.

The paired detecting legs (33, 33) of the retainer 30, which will be described later, are inserted into diametrically between the paired side walls (27, 27) and the paired first pull-out locked portions (25, 25), and between the paired side walls (27, 27) and the paired second pull-out locked portions (26, 26). The push-in inhibition inclined faces (28a, 28a) of the upper faces of the push-in locked portions (28, 28) are locked in the push-in direction to push-in inhibition portions (33b, 33b) of the paired detecting legs (33, 33) of the retainer 30.

3. Detailed Constructions of Retainer 30

Detailed constructions of the retainer 30 will be described with reference to FIG. 4A through FIG. 4F. The retainer 30 includes a base 31, which is slightly curved plate-shaped, paired locking legs (32, 32) which are provided at both ends of the base 31 and can be enlarged, the paired detecting legs (33, 33) which are provided at both ends of the base 31 and are bendable in the axial direction, paired inner-side locking pieces (34, 34), and releasing operation portions (35, 35).

Each of the paired locking legs (32, 32) includes a temporary retaining portion 41, and a permanent retaining portion 42. The temporary retaining portions (41, 41) are provided on the end sides of the locking legs (32, 32). The faces on the inner side in the axial direction of the temporary retaining portions (41, 41) (i.e., the left faces in FIG. 4A) are formed into a plane shape (i.e., as a shape of the faces orthogonal to the axis), but faces (41a, 41a) on the insertion side in the axial direction of the temporary retaining portions (41, 41) (i.e., the right faces in FIG. 4A) are formed to be thinner toward the opposite sides. In a state where the retainer 30 is placed at the initial position, the temporary retaining portions (41, 41) allow the passing of the annular boss 3a of the piped body 3, and can be locked in the axial direction to the passed annular boss 3a.

The permanent retaining portions (42, 42) are provided in the locking legs (32, 32) on the side of the base 31. In a state where the retainer 30 is placed at the confirmation position, the permanent retaining portions (42, 42) can be locked in the axial direction to the annular boss 3a of the piped body 3.

The paired detecting legs (33, 33) are provided adjacent to the paired locking legs (32, 32) in the axial direction through the clearances in the axial direction. The paired detecting legs (33, 33) are bendable in the axial direction independently of the paired locking legs (32, 32).

The detection portions (33a, 33a), which protrude inward in the diametric direction, are provided on the end sides of the detecting legs (33, 33). The push-in inhibition portions (33b, 33b), which protrude outward in the diametric direction on the side of the base 31 from the detection portions (33a, 33a), are provided in the detecting legs (33, 33). The rigidity of the push-in inhibition portions (33b, 33b) is obtained while the detection portions (33a, 33a) are made thinner. This can make the retainer 30 smaller and therefore can make the quick connector 1 smaller.

The paired inner-side locking pieces (34, 34) are provided adjacent to the paired detecting legs (33, 33) in the axial direction through the clearances in the axial direction. The paired inner-side locking pieces (34, 34) are shorter than the paired locking legs (32, 32) and the paired detecting legs (33, 33).

The releasing operation portions (35, 35) are formed to be extended in the up direction through the clearances from both ends of the base 31. The releasing operation portions (35, 35) enlarge the paired locking legs (32, 32) by a force sandwiching from the outside.

4. Explanations on Movements or Actions

Next, explanations will be made on movements or actions of the respective component parts in the quick connector 1 when the operator or worker inserts the piped body 3 into the quick connector 1 and pulls the piped body 3 out of the quick connector 1.

4-1. State Before Piped-Body Insertion

Figure 5A:
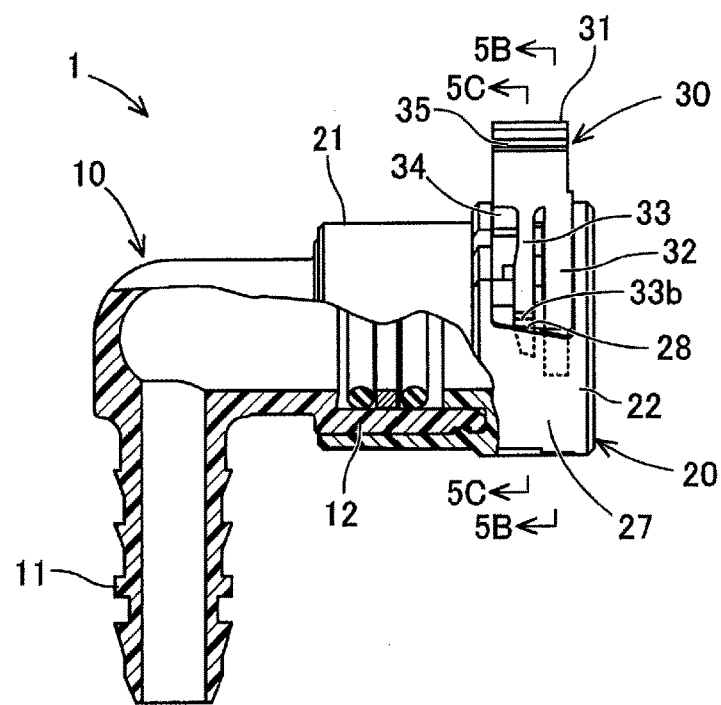
FIG. 5A illustrates a state before inserting the piped body into the quick connector (i.e., a state before the piped-body insertion), and is an axial partial cross-sectional diagram of the quick connector in a case where the retainer is placed at an initial position.
Figure 5B:
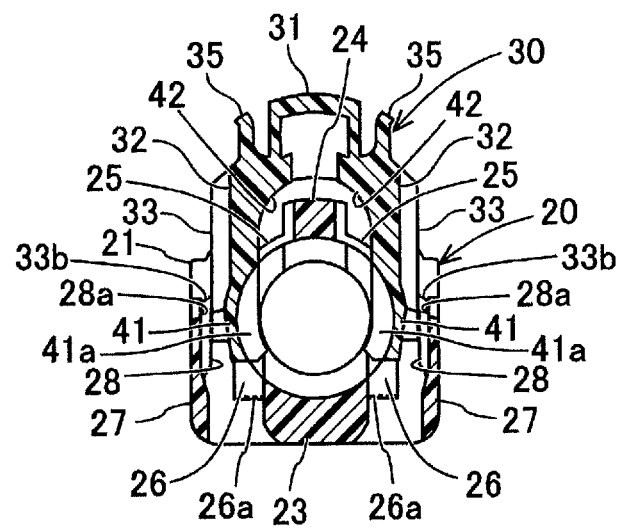
FIG. 5B is a cross-sectional diagram taken along the line "5B"-"5B" in FIG. 5A.
Figure 5C:
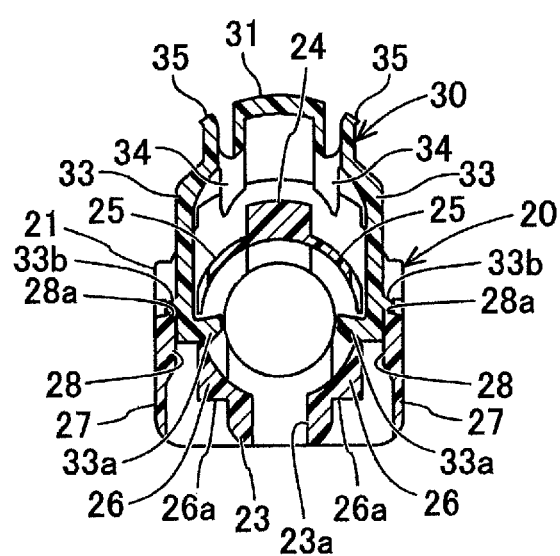
FIG. 5C is a cross-sectional diagram taken along the line "5C"-"5C" in FIG. 5A.

First, explanations will be made on a state before the piped body 3 is inserted into the quick connector 1 with reference to FIG. 5A through FIG. 5C. As illustrated in FIG. 5A through FIG. 5C, the "state before piped-body insertion" is a state where the retainer 30 is placed at the initial position relative to the second housing 20. That is, the retainer 30 is mounted on the second housing 20 from above in the axial direction between the tubular portion 21 and the opening-end seat member 22. As illustrated in FIG. 5B, the thin portions of the temporary retaining portions (41, 41) of the paired locking legs (32, 32) are placed at the entering position of the annular boss 3a of the piped body 3. That is, the temporary retaining portions (41, 41) are placed at positions where they can come into contact with the annular boss 3a of the piped body 3.

Note that, there are clearances between the paired locking legs (32, 32) and the side walls (27, 27) at the initial position to the extent that the paired locking legs (32, 32) can be enlarged diametrically. Thus, when the retainer 30 is placed at the initial position, the paired locking legs (32, 32) are enlarged diametrically to allow the passing of the annular boss 3a of the piped body 3.

As illustrated in FIG. 5C, the detection portions (33a, 33a) of the paired detecting legs (33, 33) are put in such a state as entering into the peripheral clearances between the paired first pull-out locked portions (25, 25) and the paired second pull-out locked portions (26, 26). That is, the detection portions (33a, 33a) are locked in the pull-out direction to the first pull-out locked portions (25, 25). In this state, the detection portions (33a, 33a) are not locked in the push-in direction to the second pull-out locked portions (26, 26). The detection portions (33a, 33a) are placed at positions where they can come into contact with the annular boss 3a of the piped body 3.

The push-in inhibition portions (33b, 33b) come into contact with the push-in inhibition inclined faces (28a, 28a) of the push-in locked portions (28, 28) in a state where the paired detecting legs (33, 33) do not bend to the inner side in the axial direction. That is, the push-in inhibition portions (33b, 33b) are locked in the push-in direction to the push-in inhibition inclined faces (28a, 28a). In this manner, when the retainer 30 is placed at the initial position, the retainer 30 is locked in the push-in direction to the second housing 20, thereby being inhibited from being moved by the push-in operation.

4-2. Retainer Push-in State when Piped Body is not Inserted

Figure 6:
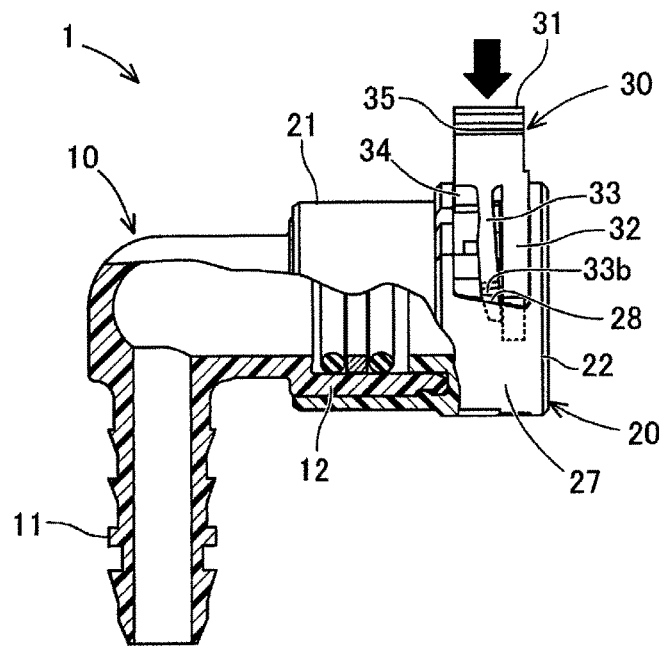
FIG. 6 is an axial partial cross-sectional diagram of the quick connector in a case where a push-in operation of the retainer placed at the initial position is carried out in a state before inserting the piped body into the quick connector (i.e., a retainer push-in state when the piped body is not inserted)

Explanations will be made on the push-in operation of the retainer 30 in a state before the piped body 3 is inserted into the quick connector 1 with reference to FIG. 6. As explained above, the push-in inhibition portions (33b, 33b) of the retainer 30 are locked in the push-in direction to the push-in inhibition inclined faces (28a, 28a) of the second housing 20.

When, in this state, the push-in operation of the retainer 30 is carried out, the push-in inhibition portions (33b, 33b) are pressed onto the push-in locked portions (28, 28), and are moved to the insertion side in the axial direction. That is, the paired detecting legs (33, 33) bend to the insertion side in the axial direction. This is because the push-in inhibition inclined faces (28a, 28a) are inclined in the down direction (i.e., in the push-in direction) toward the insertion side in the axial direction.

When the paired detecting legs (33, 33) bend to the insertion side in the axial direction, the paired detecting legs (33, 33) come into contact with the paired locking legs (32, 32). Thus, the push-in inhibition portions (33b, 33b) of the paired detecting legs (33, 33) are maintained to be locked in the push-in direction to the push-in inhibition inclined faces (28a, 28a). That is, when the piped body 3 is not inserted into the quick connector 1, the retainer 30 is inhibited from being moved from the initial position to the confirmation position.

In the quick connector 1 of this embodiment, the detection portions (33a, 33a) and the push-in inhibition portions (33b, 33b) are provided at different parts. In detail, the detection portions (33a, 33a), which are pressed by the annular boss 3a of the piped body 3, are provided on the end sides of the detecting legs (33, 33). The push-in inhibition portions (33b, 33b), which are locked in the push-in direction to the push-in locked portion (28, 28) of the second housing 20, are provided on the side of the base 31 from the detection portions (33a, 33a), in some of the detecting legs (33, 33). Thus, the distance from the base 31 to the push-in inhibition portions (33b, 33b) is shorter than the distance from the base 31 to the detection portions (33a, 33a).

When the push-in operation of the retainer 30 is carried out in a state where the piped body 3 is not inserted, even if the detecting legs (33, 33) of the retainer 30 are buckled, the buckling length is short. Thus, the shift amount of the push-in inhibition portions (33b, 33b) is small. Even with the detecting legs (33, 33) being made smaller, when the piped body 3 is not inserted, the retainer 30 is inhibited from moving from the initial position to the confirmation position by the push-in operation. That is, the quick connector 1 can make the detecting legs (33, 33) of the retainer 30 smaller, and to securely detect the insertion of the piped body 3.

Further, the push-in inhibition inclined faces (28a, 28a) are formed in the push-in locked portions (28, 28). Thus, as explained above, when the push-in operation of the retainer 30 is carried out from the initial position in a state where the piped body 3 is not inserted, the push-in inhibition inclined faces (28a, 28a) allow the detecting legs (33, 33) to bend to the insertion side in the axial direction. Only when the detecting legs (33, 33) bend to the inner side in the axial direction, the push-in inhibition portions (33b, 33b) are put in such a state as being not locked to the push-in locked portions (28, 28).

That is, by the push-in operation when the piped body 3 is not inserted, the detecting legs (33, 33) bend in the direction opposite to the locking canceling direction. Thus, when the piped body 3 is not inserted, the retainer 30 can be inhibited more securely from moving from the initial position to the confirmation position by the push-in operation. In particular, the push-in inhibition inclined faces (28a, 28a) are formed in the push-in locked portions (28, 28), and the normal vector of the push-in inhibition inclined faces (28a, 28a) has a component on the insertion side in the axial direction and a component in the pull-out direction. The push-in inhibition inclined faces (28a, 28a) are formed as explained above, so that when the piped body 3 is not inserted, the retainer 30 can be inhibited securely from moving from the initial position to the confirmation position by the push-in operation.

4-3. State of Piped-Body Insertion

Figure 7:
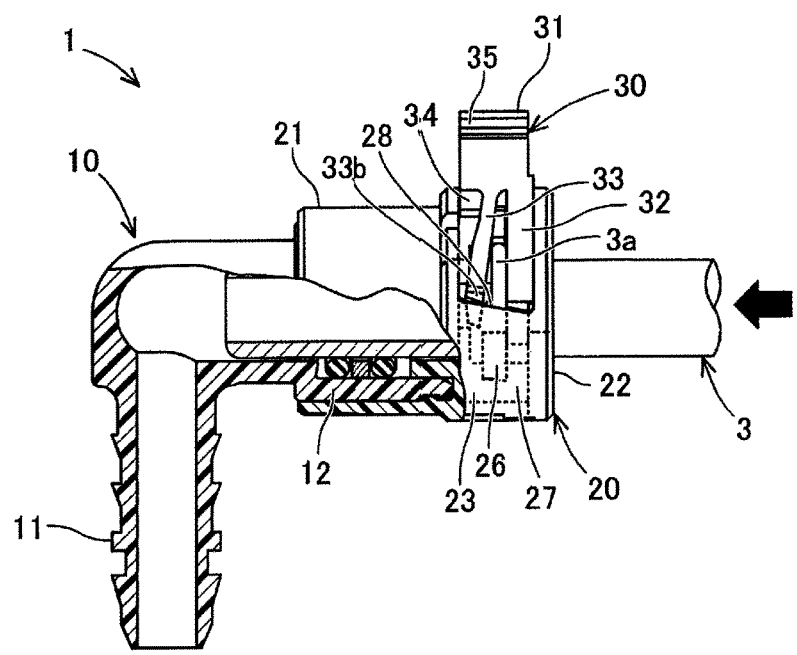
FIG. 7 is an axial partial cross-sectional diagram of the quick connector in a state where the piped body is inserted into the quick connector (i.e., a state of the piped-body insertion)

Explanations will be made on a state where the piped body 3 is inserted from the side of the opening-end seat member 22 of the second housing 20 to the proper position with reference to FIG. 7. As illustrated in FIG. 7, as the piped body 3 is being inserted into the second housing 20, the annular boss 3a of the piped body 3 presses the faces (41a, 41a) on the insertion side in the axial direction of the temporary retaining portions (41, 41). With the pressing, the paired locking legs (32, 32) are enlarged. The annular boss 3a of the piped body 3 can pass through the temporary retaining portions (41, 41), so that the piped body 3 can be inserted to the further inner side in the axial direction.

When the annular boss 3a of the piped body 3 passes through the paired locking legs (32, 32), the enlarging of the paired locking legs (32, 32) is canceled. That is, the temporary retaining portions (41, 41) of the paired locking legs (32, 32) are locked in the axial direction to the annular boss 3a of the piped body 3. Thus, the piped body 3 is retained.

When the piped body 3 passes through the paired locking legs (32, 32), the annular boss 3a of the piped body 3 comes into contact with the detection portions (33a, 33a) of the paired detecting legs (33, 33). When the piped body 3 is moved to the further inner side in the axial direction, the annular boss 3a of the piped body 3 presses the detection portions (33a, 33a) to the inner side in the axial direction. Thus, as illustrated in FIG. 7, the paired detecting legs (33, 33) bend to the inner side in the axial direction. By the presence of the paired inner-side locking pieces (34, 34), spaces are formed on the inner side in the axial direction of the paired detecting legs (33, 33), so that the paired detecting legs (33, 33) can bend in the axial direction.

Since the paired detecting legs (33, 33) bend to the inner side in the axial direction, the push-in inhibition portions (33b, 33b) are put in such a state as being not locked in the push-in direction to the push-in locked portions (28, 28) of the second housing 20. Thus, the paired detecting legs (33, 33) are allowed to move to the confirmation position in the push-in direction.

4-4. At Time of Pulling Out Piped Body 3

The operator or worker pulls out the piped body 3 after he/she has inserted the piped body 3 into the quick connector 1, as illustrated in FIG. 7, and then reinserts the piped body 3. For instance, the piped body 3 is repeatedly inserted into and pulled out of the quick connector 1 during assembling, and is pulled out of the quick connector 1 during maintenance.

When the piped body 3 is inserted into the quick connector 1, the temporary retaining portions (41, 41) are locked in the axial direction to the annular boss 3a of the piped body 3 to retain the piped body 3. The operator or worker operates the releasing operation portions (35, 35) to enlarge the paired locking legs (32, 32), thereby being able to pull out the piped body 3.

Movements or actions of the paired detecting legs (33, 33) on this occasion will be explained. Once the piped body 3 is inserted at the proper position, the paired detecting legs (33, 33) bend to the inner side in the axial direction, as illustrated in FIG. 7, to cancel the locking to the push-in locked portions (28, 28). The piped body 3 is pulled out of the quick connector 1, so that the contacting of the detection portions (33a, 33a) onto the annular boss 3a of the piped body 3 is canceled. That is, the paired detecting legs (33, 33) do not receive the pressing force from the annular boss 3a.

The return inclined faces (28b, 28b) are formed on the inner side in the axial direction, in some of the upper faces of the push-in locked portions (28, 28) of the second housing 20. That is, when the paired detecting legs (33, 33) do not receive the pressing force from the annular boss 3*a*, the push-in inhibition portions (33*b*, 33*b*) are guided by the return inclined faces (28*b*, 28*b*) to cancel the bending of the paired detecting legs (33, 33) in the axial direction.

When the piped body 3 is inserted into the quick connector 1 and is then pulled out of the quick connector 1, the return inclined faces (28*b*, 28*b*) return the push-in inhibition portions (33*b*, 33*b*) to the initial state (i.e., to the state where the push-in inhibition portions (33*b*, 33*b*) do not bend). Thus, when the piped body 3 is inserted into the quick connector 1 and is then pulled out of the quick connector 1, the retainer 30 is not allowed to move in the push-in direction. That is, the return inclined faces (28*b*, 28*b*) prevent the retainer 30 from malfunctioning. In particular, the return inclined faces (28*b*, 28*b*) are formed on the inner side in the axial direction from the push-in inhibition inclined faces (28*a*, 28*a*) of the push-in locked portions (28, 28), and the normal vector of the return inclined faces (28*b*, 28*b*) has a component on the inner side in the axial direction and a component in the pull-out direction. The return inclined faces (28*b*, 28*b*) are formed as explained above to securely prevent the retainer 30 from malfunctioning.

4-5. Confirmed State

Explanations will be made on a state where the retainer 30 is moved from the initial position to the confirmation position after the piped body 3 has been inserted at the proper position with reference to FIG. 8A through FIG. 8C. The retainer 30 is moved from the state in FIG. 7 in the push-in direction (i.e., in the down direction).

As illustrated in FIG. 7, the paired detecting legs (33, 33) of the retainer 30 bend to the inner side in the axial direction at the initial position. Thus, the push-in inhibition portions (33*b*, 33*b*) are not locked in the push-in direction to the push-in locked portions (28, 28). Further, the detection portions (33*a*, 33*a*) are not locked in the push-in direction to the paired second pull-out locked portions (26, 26). Thus, the retainer 30 is in such a state as being able to be moved in the push-in direction.

Figure 8A:
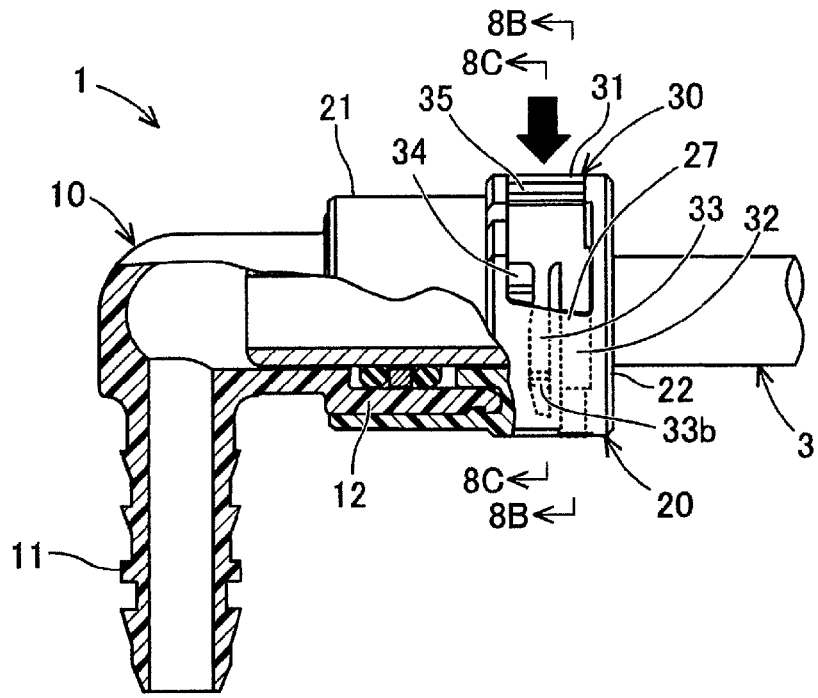
FIG. 8A is an axial partial cross-sectional diagram of the quick connector in a state where the retainer is moved from the initial position to a confirmation position (i.e., a confirmed state)
Figure 8B:
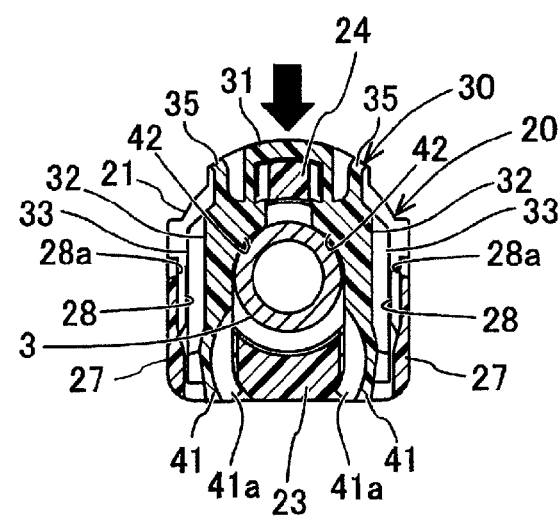
FIG. 8B is a cross-sectional diagram taken along the line "8B"-"8B" in FIG. 8A.
Figure 8C:
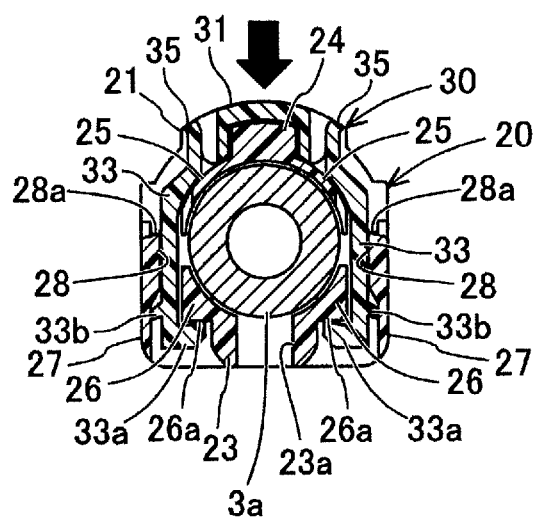
FIG. 8C is a cross-sectional diagram taken along the line "8C"-"8C" in FIG. 8A.

By carrying out the push-in operation of the retainer 30 in this state, the retainer 30 is moved to the confirmation position, as illustrated in FIG. 8A through FIG. 8C. The permanent retaining portions (42, 42) of the paired locking legs (32, 32) are locked in the axial direction to the annular boss 3*a* of the piped body 3 at the confirmation position. The enlarging of the paired locking legs (32, 32) is inhibited by the presence of the side walls (27, 27). When the retainer 30 is placed at the confirmation position, the piped body 3 is locked to the permanent retaining portions (42, 42) and is retained securely.

Further, as illustrated in FIG. 8A, the bending of the paired detecting legs (33, 33) to the inner side in the axial direction are canceled at the confirmation position. That is, as illustrated in FIG. 8C, the detection portions (33*a*, 33*a*) are moved to below the lower faces (26*a*, 26*a*) of the paired second pull-out locked portions (26, 26). That is, the detection portions (33*a*, 33*a*) are locked in the pull-out direction to the paired second pull-out locked portions (26, 26). Further, the push-in inhibition portions (33*b*, 33*b*) are moved to below the push-in locked portions (28, 28). On this occasion, the push-in inhibition portions (33*b*, 33*b*) are in such a state as being not locked in the pull-out direction to the push-in locked portions (28, 28).

As explained above, the push-in inhibition portions (33*b*, 33*b*) of the detecting legs (33, 33) are locked in the push-in direction from the initial position to the confirmation position, to the push-in locked portions (28, 28) of the second housing 20. The detection portions (33*a*, 33*a*) of the detecting legs (33, 33) are locked in the pull-out direction from the confirmation position to the initial position, to the paired second pull-out locked portions (26, 26) of the second housing 20.

The detection portions (33*a*, 33*a*) are formed on the end sides of the detecting legs (33, 33). Thus, when the detecting legs (33, 33) do not greatly bend at the confirmation position, the detection portions (33*a*, 33*a*) remain locked in the pull-out direction to the second pull-out locked portions (26, 26). In this manner, the retainer 30 is not easily pulled out of the second housing 20 at the confirmation position. Here, the retainer 30 locks the piped body 3 at the confirmation position. That is, by the above construction, the retainer 30 locks the piped body 3 securely at the confirmation position.

4-6. Released State

The piped body 3 is pulled out of the quick connector 1 during maintenance. From the state illustrated in FIG. 8A, the operator or worker holds the releasing operation portions (35, 35), and pulls the piped body 3. Then, the detection portions (33*a*, 33*a*) are moved to the inner side in the axial direction along the inclination of the lower faces (26*a*, 26*a*) of the second pull-out locked portions (26, 26). That is, the paired detecting legs (33, 33) bend to the inner side in the axial direction.

Thus, the locking of the detection portions (33*a*, 33*a*) to the second pull-out locked portions (26, 26) in the pull-out direction is canceled, and the push-in inhibition portions (33*b*, 33*b*) are moved to the inner side in the axial direction of the push-in locked portions (28, 28). The retainer 30 is moved to the initial position illustrated in FIG. 7. That is, as illustrated in FIG. 7, the paired detecting legs (33, 33) are put in such a state as bending to the inner side in the axial direction. The annular boss 3*a* of the piped body 3 is retained by the temporary retaining portions (41, 41) of the paired locking legs (32, 32).

Subsequently, the operator or worker pinches the releasing operation portions (35, 35), and reduces the spacing distance between the end sides of the releasing operation portions (35, 35). Then, the paired locking legs (32, 32) are enlarged to cancel the locking to the annular boss 3*a* of the piped body 3 in the axial direction. In this state, the operator or worker can pull the piped body 3 out of the quick connector 1. When the piped body 3 is pulled out of the quick connector 1, the bending of the paired detecting legs (33, 33) is canceled. The retainer 30 is put in states as illustrated in FIG. 5A through FIG. 5C.

Modifications

In the above embodiment, the push-in inhibition inclined faces (28*a*, 28*a*) are provided in the push-in locked portions (28, 28) on the side walls (27, 27) of the second housing 20. It is also possible to provide the function of the push-in inhibition inclined faces to the push-in inhibition portions (33*b*, 33*b*) of the retainer 30. That is, the push-in inhibition portions (33*b*, 33*b*) have push-in inhibition inclined faces which inhibit the moving of the retainer 30 in the push-in direction in such a manner that the push-in inhibition portions (33*b*, 33*b*) and the push-in locked portions (28, 28) are pressed against each other and the detecting legs (33, 33) then bend to the insertion side in the axial direction, when the push-in operation of the retainer 30 is carried out in a state where the detecting legs (33, 33) do not bend to the inner side in the axial direction.

In the above embodiment, the return inclined faces (28b, 28b) are provided to the push-in locked portions (28, 28) on the side walls (27, 27) of the second housing 20. It is also possible to provide the function of the return inclined faces to the push-in inhibition portions (33b, 33b) of the retainer 30. That is, the push-in inhibition portions (33b, 33b) have return inclined faces which guide the push-in inhibition portions (33b, 33b) so as to cancel the bending of the detecting legs (33, 33) to the inner side in the axial direction, when the detecting legs (33, 33) come into contact with the annular boss 3a at the initial position to bend to the inner side in the axial direction and the contacting of the detecting legs (33, 33) onto the annular boss 3a is then canceled.

REFERENCE SIGNS LIST

1:quickconnector, 3:piped body, 3a:annular boss, 10:first housing, 11:tube-connection portion, 12:pipe-insertion portion, 20:second housing, 21:tubular portion, 22:opening-end seat member, 22a:central bore, 23:lower-part coupler member, 23a:through-hole, 24:upper-part coupler member, 25:first pull-out locked portion, 26:second pull-out locked portion, 26a:lower face, 27:side wall, 28:push-in locked portion, 28a:push-in inhibition inclined face, 28b:return inclined face, 30:retainer, 31:base, 32:locking leg, 33:detecting leg, 33a:detection portion, 33b:push-in inhibition portion, 34:inner-side locking piece, 35:releasing operation portion, 41:temporary retaining portion, 41a:face, 42:permanent retaining portion, 70:collar, 81, 82:annular sealing member.

What is claimed is:

1. A quick connector comprising:
a connector body into which a piped body having an annular boss can be inserted; and
a retainer provided movably relative to the connector body from an initial position to a confirmation position by a push-in operation in a direction crossing an axial direction of the connector body, and the retainer locking in the axial direction to the annular boss at the confirmation position,
the retainer including:
a base;
paired locking legs provided at both ends of the base, allowing passing of the annular boss at the initial position, and locking in the axial direction to the annular boss at the confirmation position; and
paired detecting legs provided at both ends of the base and on an inner side in the axial direction from the paired locking legs, bending to the inner side in the axial direction by contact with the annular boss at the initial position, and allowing the retainer to move to the confirmation position in a state where the paired detecting legs bend,
each of the paired detecting legs including:
a detection portion provided on the end side of the detecting leg to protrude inward in a diametric direction, and contacting with the annular boss at the initial position; and
a push-in inhibition portion provided to the detecting leg on the side of the base from the detection portion, locked in a push-in direction to the connector body in a state where the detecting leg does not bend to the inner side in the axial direction at the initial position, and put in such a state as being not locked in the push-in direction to the connector body in a state where the detecting leg bends to the inner side in the axial direction.

2. The quick connector as set forth in claim 1, wherein the bending of the detecting leg to the inner side in the axial direction is canceled at the confirmation position, the detection portion is locked in the pull-out direction to the connector body at the confirmation position, and the push-in inhibition portion is put in such a state as being not locked in the pull-out direction to the connector body at the confirmation position.

3. The quick connector as set forth in claim 1, wherein the connector body includes a push-in locked portion locked to the push-in inhibition portion at the initial position, and
at least one of the push-in inhibition portion and the push-in locked portion has a push-in inhibition inclined face inhibiting the moving of the retainer in the push-in direction in such a manner that the push-in inhibition portion and the push-in locked portion are pressed onto each other and the detecting leg then bends to the insertion side in the axial direction, when the push-in operation of the retainer is carried out in a state where the detect leg does not bend to the inner side in the axial direction.

4. The quick connector as set forth in claim 3, wherein at least one of the push-in inhibition portion and the push-in locked portion has a return inclined face guiding the push-in inhibition portion so as to cancel the bending of the detecting leg to the inner side in the axial direction, when the detecting leg comes into contact with the annular boss at the initial position to bend to the inner side in the axial direction and the contacting of the detecting leg onto the annular boss is then canceled.

5. The quick connector as set forth in claim 4, wherein the push-in inhibition inclined face is formed in the push-in locked portion,
a normal vector of the push-in inhibition inclined face has a component on the insertion side in the axial direction and a component in the pull-out direction,
the return inclined face is formed on the inner side in the axial direction from the push-in inhibition inclined face, in some of the push-in locked portion, and
a normal vector of the return inclined face has a component on the inner side in the axial direction and a component in the pull-out direction.

6. The quick connector as set forth in claim 1, wherein the push-in inhibition portion is provided to protrude outward in the diametric direction of the detecting leg.

* * * * *